United States Patent [19]
Ohki

[11] Patent Number: 5,805,990
[45] Date of Patent: Sep. 8, 1998

[54] RADIO DATA COMMUNICATIONS APPARATUS WITH BATTERY SAVING FUNCTION

[75] Inventor: Masahiro Ohki, Tokyo, Japan

[73] Assignee: NEC Corporation, Tokyo, Japan

[21] Appl. No.: 576,578

[22] Filed: Dec. 21, 1995

[30] Foreign Application Priority Data

Dec. 22, 1994 [JP] Japan .................................. 6-336360

[51] Int. Cl.⁶ .................................................. H04B 1/16
[52] U.S. Cl. .......................... 455/343; 455/574; 455/140; 375/366
[58] Field of Search .................................. 455/343, 33.1, 455/127, 126, 502, 515, 528, 574, 140; 370/311; 375/366, 369, 359, 396

[56] References Cited

U.S. PATENT DOCUMENTS

| | | | |
|---|---|---|---|
| 5,150,361 | 9/1992 | Wieczorek et al. | 370/95.1 |
| 5,175,441 | 12/1992 | den Hollander | 307/43 |
| 5,274,679 | 12/1993 | Abe et al. | 375/117 |
| 5,493,571 | 2/1996 | Engdahl et al. | 370/105.4 |

FOREIGN PATENT DOCUMENTS 1-280931  11/1989  Japan .
4-196833  7/1992  Japan .

*Primary Examiner*—Reinhard J. Eisenzopf
*Assistant Examiner*—Darnell R. Armstrong
*Attorney, Agent, or Firm*—Sughrue, Mion, Zinn, Macpeak & Seas, PLLC

[57] ABSTRACT

In a receiving apparatus for radio data communications, even after a carrier is detected in a received signal, when a start-delimiter is not detected, or when a message broadcasting packet and/or a local packet for the apparatus is not detected, the supply of a clock signal to a data demodulating section for demodulating the modulated signal is stopped.

10 Claims, 5 Drawing Sheets

Fig. 3

| H 1 | H 2 | STID | D T |

RADIO DATA COMMUNICATIONS APPARATUS WITH BATTERY SAVING FUNCTION

BACKGROUND OF THE INVENTION

1. Field of the Invention

The present invention relates to a radio data communications apparatus, and more particularly, to a receiving apparatus for radio data communications with a battery saving function.

2. Description of the Related Art

In wireless local area networks (LANs) using a high frequency band of 2.4 GHz, modems powered by batteries have been used in note-type personnel computers and portable terminals. Therefore, it is necessary to reduce the power dissipation of such modems.

In a prior wireless LAN modem, in a standby mode, a clock signal is not supplied to a data demodulating section. After a carrier is detected in a received signal, the clock signal is supplied to the data demodulating section, thus reducing the power dissipation. This will be explained later in detail.

In the above-described prior art wireless LAN modem, however, after a carrier is detected in the received signal, the digital receiving section is always clocked by the clock signal. Therefore, the power dissipation is still large.

SUMMARY OF THE INVENTION

It is an object of the present invention to reduce the power dissipation of a radio data communications apparatus, particularly, to reduce the power dissipation of the data demodulating section thereof.

According to the present invention, in a receiving apparatus for radio data communications, even after a carrier is detected in a received signal, when a start-delimiter is not detected, or when a message broadcasting packet and/or a local packet for the apparatus is not detected, the supply of a clock signal to a data demodulating section for demodulating the modulated signal is stopped.

BRIEF DESCRIPTION OF THE DRAWINGS

The present invention will be more clearly understood from the description as set forth below, as compared with the prior art, with reference to the accompanying drawings, wherein:

FIG. 3 is a diagram showing a packet used in the apparatus of FIG. 2;

DESCRIPTION OF THE PREFERRED EMBODIMENT

Before the description of the preferred embodiment, a prior art wireless modem using a direct sequence spectrum spread (DSSS) system will be explained with reference to FIG. 1.

Figure 1:
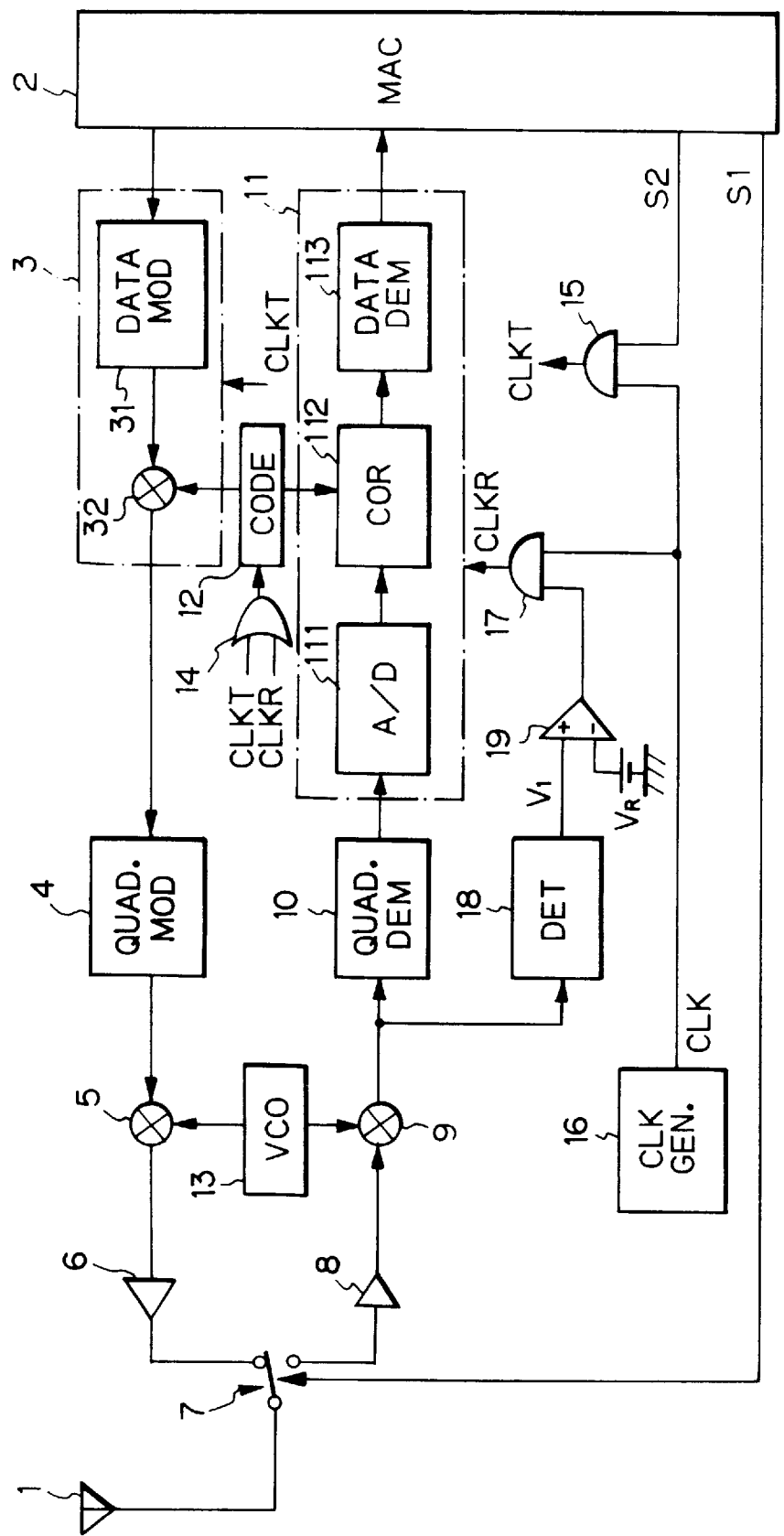
FIG. 1 is a block circuit diagram illustrating a prior art wireless modem.

In FIG. 1, reference numeral 1 designates an antenna, and 2 designates an media access control (MAC) processing section.

The transmission of data from the MAC processing section 2 via the antenna 1 is carried out by a digital transmitting section 3, a quadrature modulator 4, a mixer 5 (i.e., an intermediate frequency (IF) section), an amplifier 6 (i.e., a radio frequency (RF) section) and a transmission/reception switch 7. on the other hand, the reception of data via the antenna 1 to the MAC processing section 2 is carried out by the transmission/reception switch 7, an amplifier 8 (i.e., an RF section), a mixer 9 (i.e., an IF section), a quadrature demodulator 10 and a digital receiving section 11.

In more detail, the digital transmitting section 3 includes a data modulator 31 and a spectrum spread circuit 32 for encoding a transmitting signal by using a spread reference code signal generated from a spread reference code signal generating circuit 12. The mixer 5 mixes the output of the quadrature modulator 4 with an output of a voltage controlled oscillator (VCO) 13.

Also, the mixer 9 mixes the output of the amplifier 8 with an output of the VCO 13. The digital receiving section 11 includes an analog/digital (A/D) converter 111 for performing an A/D conversion upon the output of the quadrature demodulator 10, a correlator circuit 112 for calculating correlations between the output of the A/D converter and a spread reference code signal generated from the spread reference code generating circuit 12, and a data demodulator 113 for demodulating the output of the correlator circuit 112 into a data signal.

The digital transmitting section 3 is clocked by a clock signal CLKT, and the digital receiving section 11 is clocked by a clock signal CLKR. Also, the spread reference code signal generating circuit 12 is clocked via an OR circuit 14 by the clock signal CLKT or CLKR. The clock signal CLKT is controlled by an AND circuit 15 which receives a clock signal CLK from a clock signal generating circuit 16, and the clock signal CLKR is controlled by an AND circuit 17 which receives the clock signal CLK from the clock signal generating circuit 16.

Also, the AND circuit 15 is controlled by the MAC processing section 2. On the other hand, the AND circuit 17 is controlled by an envelope detector 18 and a comparator 19. That is, the envelope detector 18 detects a level of a carrier in a received signal, and a comparator 19 compares the output $V_1$ of the envelope detector 18 with a reference voltage $V_r$. As a result, if $V_1 > V_R$, which means that a carrier is detected in the received signal, the output of the comparator 19 is "1" (high), so that the AND circuit 17 passes the clock signal CLK as the clock signal CLKR. Otherwise, the output of the comparator 19 is "0" (low), so that the AND circuit 17 is disabled, i.e., the clock signal CLKR is inactive.

In a transmission mode, the MAC processing section 2 causes a signal SI to be "0", so that the switch 7 is placed at an upper side. Also, the MAC processing section 2 causes a signal S2 to be "1", so that the digital transmitting section 3 is clocked by the clock signal CLKT. As a result, a transmission data signal from the MAC processing section 2 is spectrum-spreaded by the digital transmitting section 3. Then, the spectrum spread signal of the digital transmitting section 3 is quadrature-modulated by the quadrature modulator 4. Then, the output of the quadrature modulator 4 is mixed with the output signal of the VCO 13 at the mixer 5, and is amplified by the amplifier 6. Thus, a high frequency packet signal is emitted from the antenna 1. Next, after a predetermined time period has passed, the MAC processing section 2 causes the signal S1 to be "1", so that the switch 7 is placed at a lower side, i.e., in a standby mode. Simultaneously, the MAC processing section 2 causes the signal S2 to be "0" (low), so that the digital transmitting circuit 3 is not supplied with the clock signal CLKT. Thus, the apparatus enters a standby mode.

In the standby mode, when a high frequency modulated signal is received by the antenna 1, the signal is amplified by the amplifier 8, and is mixed with the output of the VCO 13 to generate an IF signal. As a result, the envelope detector 18 and the comparator 19 detect a carrier in the IF signal, so that the digital receiving section 11 is clocked by the clock signal CLKR. Thus, the output of the quadrature demodulator 10 is converted into a data signal by the digital receiving section 11, and the data signal is transmitted to the MAC processing section 2.

In FIG. 1, since the clock signal CLKR of the digital receiving section 11 is stopped in a standby mode, the power dissipation can be reduced. However, after a carrier is detected in the received signal, the digital receiving section 11 is always clocked by the clock signal CLKR. Therefore, the power dissipation continues and is large.

Figure 2:
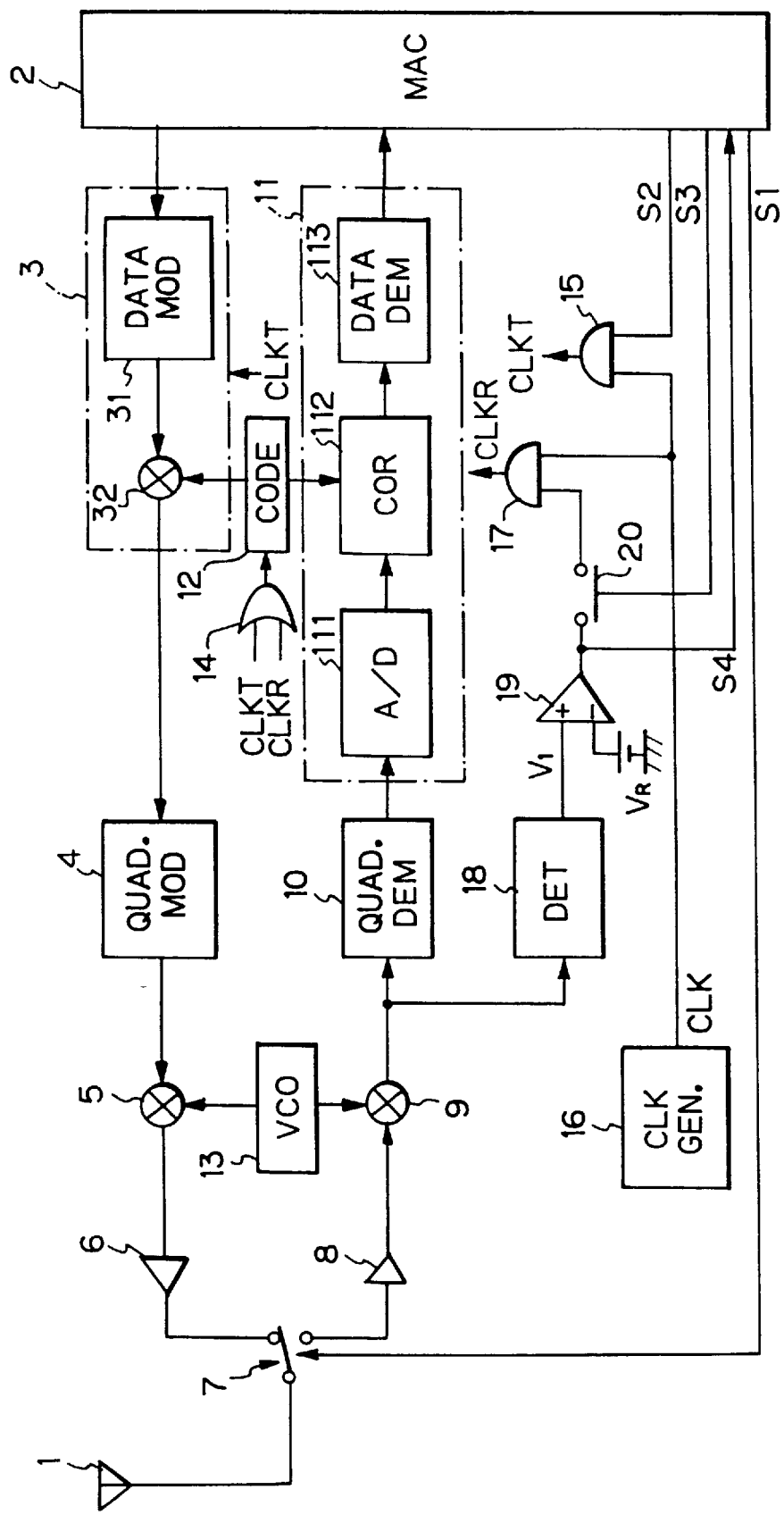
FIG. 2 is a block circuit diagram illustrating an embodiment of the wireless modem according to the present invention.

In FIG. 2, which illustrates an embodiment of the present invention, a switch 20 is interposed between the comparator 19 and the AND circuit 17. The switch 20 is controlled by a signal S3 generated from the MAC processing section 2. Also, the output of the comparator 19 is supplied as a signal S4 to the MAC processing section 2.

Figure 3:
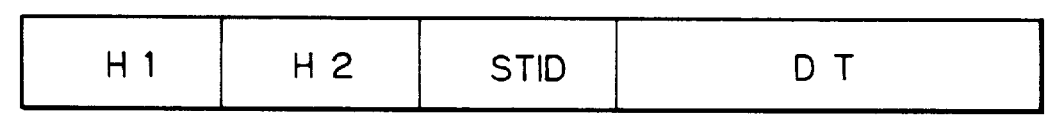

In FIG. 3, which shows a format of a packet used in the apparatus of FIG. 2, a header H1 includes a preamble signal and a start-delimiter for showing effectiveness of the packet, and a header H2 includes an identifier for indicating that the packet is an address broadcasting packet. Also, a header STID includes an identifier for a destination of a local packet. Further, DT is a variable length data.

The operation of the MAC processing of FIG. 2 is explained next with reference to FIG. 4.

First, at step 401, it is determined whether or not there is a request for transmission of a packet. As a result, if there is such a request, the control proceeds to steps 402 through 404. Otherwise, the control proceeds to steps 405 and 406.

At step 402, the MAC processing section 2 causes the signal S1 to be "0", so that the switch 7 is placed at an upper side. Also, the MAC processing section 2 causes a signal S2 to be "1", so that the digital transmitting section 3 is clocked by the clock signal CLKT.

Then, at step 404, the MAC processing section 2 waits for a predetermined time period to pass. During this time period, a transmission data signal from the MAC processing section 2 is spectrum-spread by the digital transmitting section 3. Then, the spectrum spread signal of the digital transmitting section 3 is quadrature-modulated by the quadrature modulator 4. Then, the output of the quadrature modulator 4 is mixed with the output signal of the VCO 13 at the mixer 5, and is amplified by the amplifier 6. Thus, a high frequency packet signal is emitted from the antenna 1.

Then, after a predetermined time period has passed to complete the transmitting operation of one packet, the control at step 404 returns to step 401.

On the other hand, at step 405, the MAC processing section 2 causes the signal S1 to be "1", so that the switch 7 is placed at a lower side, i.e., in a standby mode. Simultaneously, at step 406, the MAC processing section 2 causes the signal S2 to be "0" (low), so that the digital transmitting circuit 3 is not supplied with the clock signal CLKT. Further, at step 407, the MAC processing section 2 causes the signal S3 to be "1" (high) to turn ON the switch 20. Thus, the apparatus enters a standby mode. Then, the control is transferred to step 408 which carries out a reception operation which is shown in detail in FIG. 5.

In the standby mode, when a high frequency modulated signal is received by the antenna 1, the signal is amplified by the amplifier 8, and is mixed with the output of the VCO 13 to generate an IF signal. As a result, when the envelope detector 18 and the comparator 19 detect a carrier in the header H1 of the IF signal, the digital receiving section 11 is clocked by the clock signal CLKR, since the switch 20 is turned ON. Thus, the output of the quadrature demodulator 10 is converted into a data signal by the digital receiving section 11, and the data signal is transmitted to the MAC processing section Also, the output signal S4 of the comparator 19 becomes "1" (high). Therefore, the control proceeds from step 501 to step 502. Note that, if a carrier is not detected in the received signal (S4="0"), the control at step 501 returns to step 401 of FIG. 4.

At step 502, the MAC processing section 2 determines whether or not a start-delimiter is included in the header H1 of the data signal. As a result, only when such a start-delimiter is included in the header H1 of the data signal, does the control proceed to step 503. Otherwise, the control proceeds to step 506.

At step 503, the MAC processing section 2 determines whether or not a message broadcasting identifier is included in the header H2 of the data signal. As a result, only when such a message broadcasting identifier is included in the header H2 of the data signal, does the control proceed to step 505. Otherwise, the control proceeds to step 504.

At step 504, the MAC processing section 2 determines whether or not a local identifier for this apparatus is included in the header STID of the data signal. As a result, only when such a local identifier for this apparatus is included in the header STID of the data signal, does the control proceed to step 505. Otherwise, the control proceeds to step 506.

At step 505, the MAC processing section 2 waits for a predetermined time period to pass. During this time period, the processing of the variable length data DT of the data signal is completed.

On the other hand, at step 506, the MAC processing section causes the signal S2 to be "0", to turn OFF the switch 20. As a result, the digital receiving circuit 11 is not supplied with the clock signal CLKR, so that the processing of the variable length data DT of the data signal is interrupted.

Figure 4:
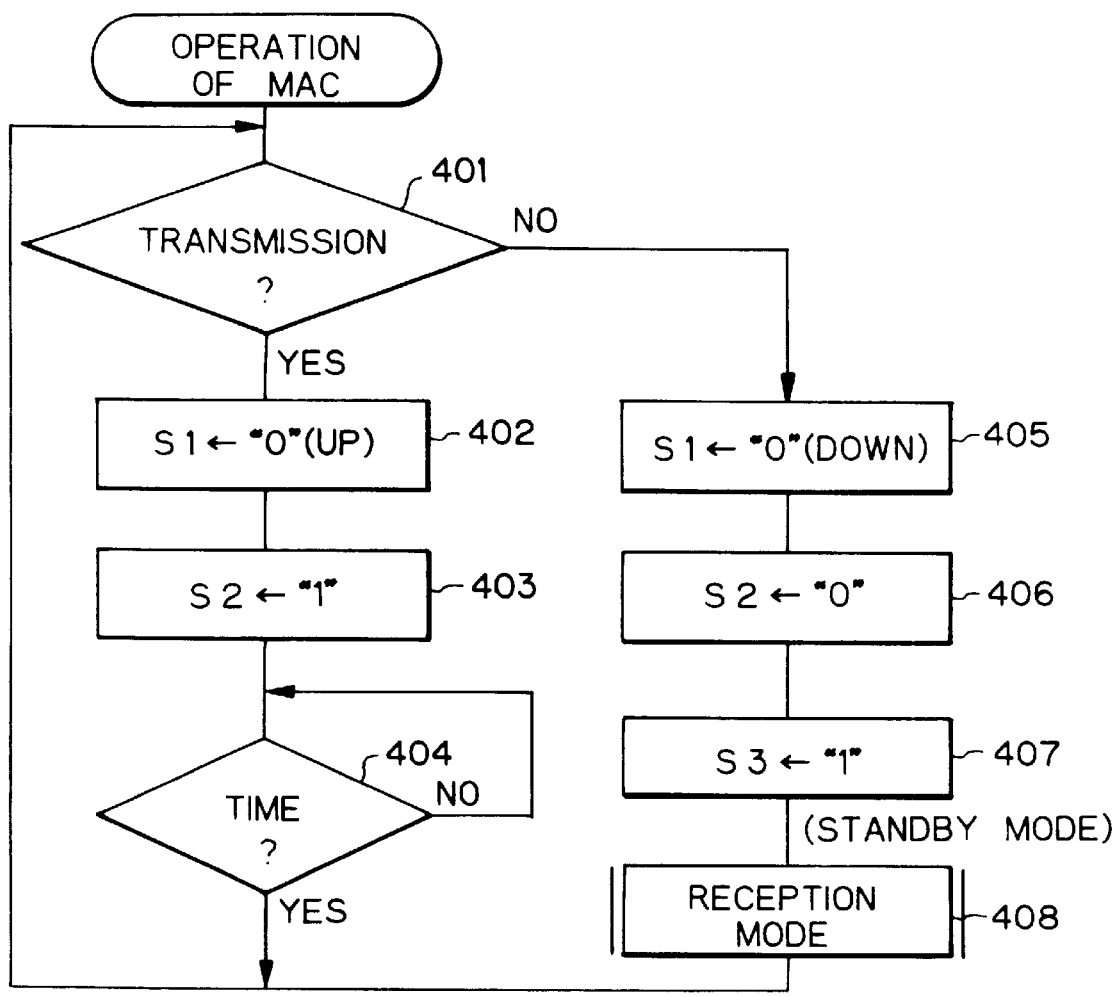
FIG. 4 is a flowchart showing the operation of the media access control (MAC) processing section of FIG. 2.

The control at steps 505 and 506 returns to step 401 of FIG. 4.

Thus, in the above-described embodiment, even after a carrier is detected in a received signal, when a start-delimiter is not detected, or when a message broadcasting packet and a local packet for the apparatus are both not detected, the supply of the clock signal CLKR to the digital receiving section 11 is stopped, thus further reducing the power dissipation.

Figure 5:
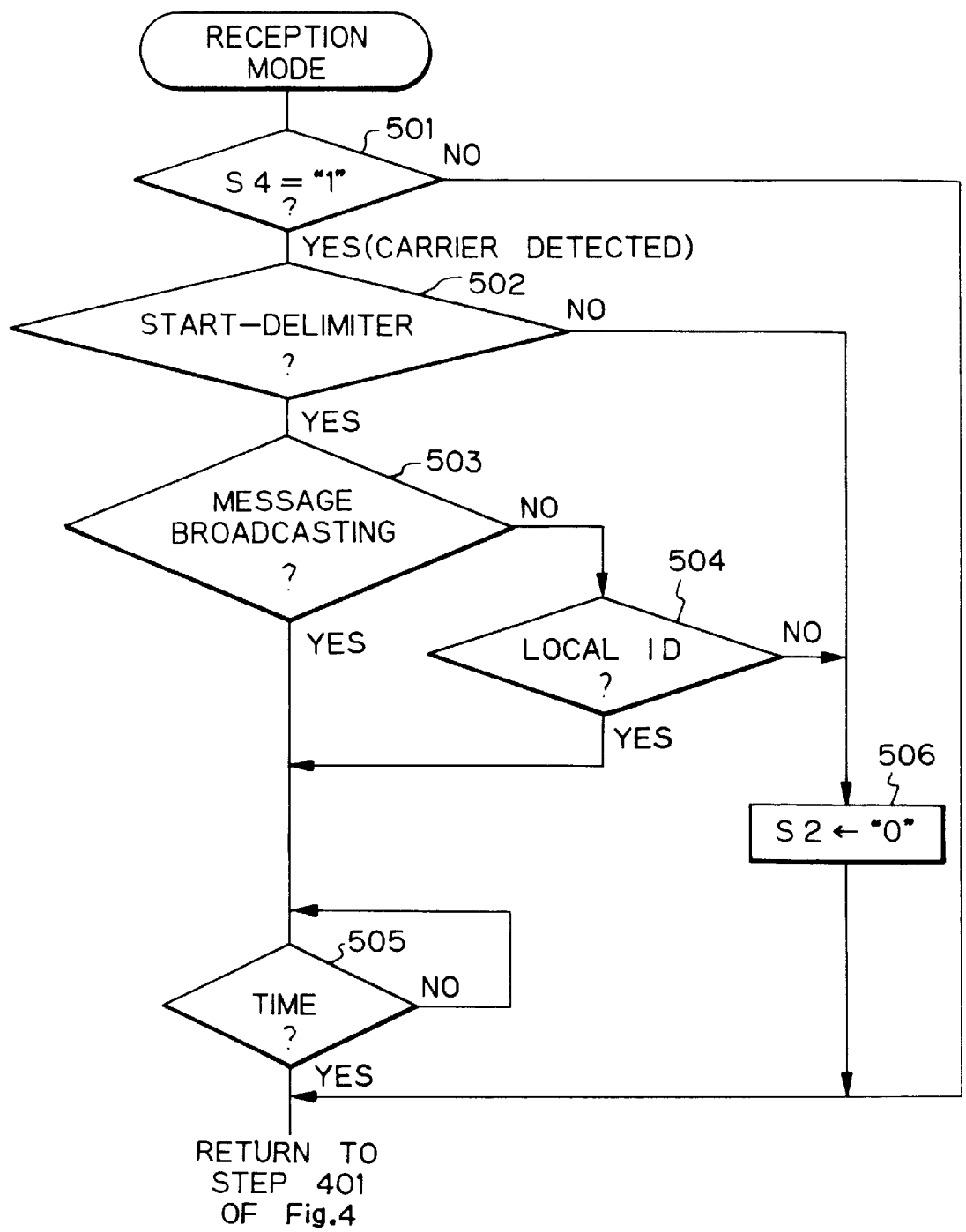
FIG. 5 is a detailed flowchart of the reception mode step of FIG. 4.

Note that, in FIG. 5, steps 502, 503 and 504 are provided; however, at least one of steps 502, 503 and 504 only need be provided. In this case, the power dissipation can be also reduced as compared with the prior art.

As explained hereinbefore, according to the present invention, since the supply of a clock signal to a data demodulating section is stopped as occasion demands, even after a carrier is detected to establish a synchronization state, the power dissipation can be further reduced.

I claim:

1. A receiving apparatus for radio data communications, comprising:

a receiving means for receiving a modulated signal;

a data demodulating means, connected to said receiving means, for demodulating said modulated signal into a data signal;

a carrier detecting means, connected to said receiving means, for detecting a carrier in said modulated signal;

a starter-delimiter detecting means connected to said data demodulating means, for detecting a start-delimiter in said data signal after said carrier is detected in said modulated signal;

a clock signal supplying means, connected to said carrier detecting means and said data demodulating means, for supplying a clock signal to said data demodulating means when said carrier is detected in said modulated signal; and means for disabling supply of said clock signal to said data demodulating means when said start-delimiter is not detected, said means for disabling supply of said clock signal connected between said clock signal supplying means and said data demodulating means.

2. The apparatus as set forth in claim 1, further comprising:

a message broadcasting packet detecting means, connected to said data demodulating means, for detecting a message broadcasting packet in said data signal after said start-delimiter is detected; and means, connected to said data demodulating means, for processing said message broadcasting packet when said message broadcasting packet is detected.

3. The apparatus as set forth in claim 1, further comprising:

a local packet detecting means, connected to said data demodulating means, for detecting a local packet for said apparatus in said data signal after said start-delimiter is detected; and means, connected to said data demodulating means, for processing said local packet when said local packet is detected.

4. The apparatus as set forth in claim 1, further comprising:

a message broadcasting packet detecting means, connected to said data demodulating means, for detecting a message broadcasting packet in said data signal after said start-delimiter is detected;

means, connected to said data demodulating means, for processing said message broadcasting packet when said message broadcasting packet is detected;

a local packet detecting means, connected to said data demodulating means, for detecting a local packet for said apparatus in said data signal after said message broadcasting packet is not detected; and means, connected to said data demodulating means, for processing said local packet when said local packet is detected;

wherein said means for disabling supply of said clock signal disables supply of said clock signal to said data demodulating means when said local packet is not detected.

5. The apparatus as set forth in claim 1, wherein said radio data communications are radio spread spectrum communications.

6. A receiving apparatus for radio data communications, comprising:

a receiving means for receiving a modulated signal;

a data demodulating means, connected to said receiving means, for demodulating said modulated signal into a data signal;

a carrier detecting means, connected to said receiving means, for detecting a carrier in said modulated signal;

a clock signal supplying means, connected to said carrier detecting means and said data demodulating means, for supplying a clock signal to said data demodulating means when said carrier is detected in said modulated signal;

a message broadcasting packet detecting means, connected to said data demodulating means, for detecting a message broadcasting packet in said data signal after said carrier signal is detected in said modulated signal;

means, connected to said data demodulating means, for processing said message broadcasting packet when said message broadcasting packet is detected;

a local packet detecting means, connected to said data demodulating means, for detecting a local packet in said data signal after said message broadcasting packet is not detected;

means, connected to said data demodulating means, for processing said local packet when said local packet is detected; and means, connected to said data demodulating means and said clock signal supplying means, for disabling supply of said clock signal to said data demodulating means when said local packet is not detected.

7. A receiving apparatus for radio data communications, as defined in claim 1, wherein said means for disabling supply of said clock signal comprises a comparator, a switch and a logical AND gate.

8. A receiving apparatus for radio data communications, as defined in claim 1, wherein said local packet detecting means comprises a controller for controlling said means for disabling supply of said clock signal.

9. A receiving apparatus for radio data communications, as defined in claim 6, wherein said means for disabling supply of said clock signal comprises a comparator, a switch and a logical AND gate.

10. A receiving apparatus for radio data communications, as defined in claim 6, wherein said start-delimiter detecting means comprises a controller for controlling said means for disabling supply of said clock signal.

* * * * *